US006757770B1

United States Patent
Terada et al.

(10) Patent No.: US 6,757,770 B1
(45) Date of Patent: Jun. 29, 2004

(54) COMPUTER SYSTEM SUPPORTING A UNIVERSAL SERIAL BUS (USB) INTERFACE AND METHOD FOR CONTROLLING A USB CORRESPONDING I/O DEVICE

(75) Inventors: Hiroshi Terada, Tokyo (JP); Manabu Koarai, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/551,225

(22) Filed: Apr. 17, 2000

(30) Foreign Application Priority Data

Apr. 15, 1999 (JP) .......................................... 11-108090

(51) Int. Cl.[7] .............................................. G06F 13/24
(52) U.S. Cl. ...................................................... 710/260
(58) Field of Search ................................ 710/260–269

(56) References Cited

U.S. PATENT DOCUMENTS

| | | | | |
|---|---|---|---|---|
| 5,148,155 A | * | 9/1992 | Martin et al. ................ | 345/173 |
| 5,581,243 A | * | 12/1996 | Ouellette et al. ........... | 345/173 |
| 5,748,888 A | * | 5/1998 | Angelo et al. .............. | 713/200 |
| 5,758,177 A | | 5/1998 | Gulick et al. | |
| 5,796,984 A | * | 8/1998 | Pearce et al. ................. | 703/24 |
| 5,797,028 A | | 8/1998 | Gulick et al. | |
| 5,802,318 A | | 9/1998 | Murray et al. | |
| 5,835,791 A | * | 11/1998 | Goff et al. ..................... | 710/62 |
| 5,896,534 A | * | 4/1999 | Pearce et al. ................. | 710/17 |
| 5,943,506 A | * | 8/1999 | Poisner ........................ | 710/48 |
| 5,958,054 A | * | 9/1999 | O'Connor et al. .......... | 713/300 |
| 5,978,903 A | * | 11/1999 | Quimby et al. ............. | 712/229 |
| 6,035,350 A | * | 3/2000 | Swamy et al. ................ | 710/73 |
| 6,038,632 A | * | 3/2000 | Yamazaki et al. .......... | 710/260 |
| 6,046,684 A | * | 4/2000 | Hamersley et al. .... | 340/825.69 |
| 6,067,589 A | * | 5/2000 | Mamata ........................ | 710/63 |
| 6,128,732 A | * | 10/2000 | Chaiken ........................ | 713/2 |
| 6,154,846 A | * | 11/2000 | Arai ............................ | 713/323 |
| 6,216,183 B1 | * | 4/2001 | Rawlins ....................... | 710/100 |
| 6,243,809 B1 | * | 6/2001 | Gibbons et al. ............... | 713/1 |
| 6,272,618 B1 | * | 8/2001 | Tyner et al. ................... | 712/31 |
| 6,282,645 B1 | * | 8/2001 | Yamaki ....................... | 713/100 |
| 6,321,286 B1 | * | 11/2001 | Goodrum et al. ........... | 710/311 |
| 6,446,213 B1 | * | 9/2002 | Yamaki ....................... | 713/300 |
| 6,480,914 B1 | * | 11/2002 | Hsieh ........................... | 710/73 |
| 6,505,263 B1 | * | 1/2003 | Larson et al. ............... | 710/100 |
| 6,564,276 B1 | * | 5/2003 | Tyner ........................... | 710/260 |

FOREIGN PATENT DOCUMENTS

| | | | | |
|---|---|---|---|---|
| JP | 07287682 A | * | 10/1995 | ........... G06F/13/10 |
| JP | 10-143388 | | 5/1998 | |

* cited by examiner

*Primary Examiner*—Paul R. Myers
(74) *Attorney, Agent, or Firm*—Finnegan, Henderson, Farabow, Garrett & Dunner, L.L.P.

(57) ABSTRACT

A computer system and a method for controlling a USB FDD include a disk driver process routine including steps of requesting a disk drive process from a host program, if a subject of the disk drive process is a USB FDD and it is also necessary to communicate through the USB HC, and generating an I/O trap system management interrupt (SMI). After generating the SMI, the communication to the USB FDD through the USB HC is executed by a split process. After finishing the split process, a status indicating a status of result of the split process is outputted to the host program.

15 Claims, 5 Drawing Sheets

CPU MEMORY ADDRESS SPACE

COMPUTER SYSTEM SUPPORTING A UNIVERSAL SERIAL BUS (USB) INTERFACE AND METHOD FOR CONTROLLING A USB CORRESPONDING I/O DEVICE

BACKGROUND OF THE INVENTION

Field of the Invention

The present invention relates to a computer system that supports a universal serial bus (USB) interface and method for controlling a USB corresponding I/O device.

Recently, a computer system that supports a universal serial bus (USB) interface has been developed. In particular, for a compact size computer system, such as a notebook type or a hand-held type personal computer, the USB supported system has merits due to increased flexibility because it becomes possible to couple various types of USB corresponding peripheral devices to the computer system without increasing the various types of connectors.

The USB is a serial interface standard for commonly processing data communications with USB corresponding devices, such as a USB floppy disk, a keyboard, a mouse, or a camera. The USB interface has been defined by the "USB specification, Ver. 1.0", issued on Jan. 15, 1996.

For coupling various types of peripheral or I/O devices to a computer system, it has conventionally been necessary for the computer system be installed with various types of connectors for the respective I/O devices. The USB can eliminate such complexity. By supporting the USB in the computer system, it becomes possible to integrate the various types of connectors into a single USB connector. Accordingly, the USB connector can increase the flexibility of using many types of I/O devices and can also reduce production cost of a computer system.

Unfortunately, however, for actually driving the USB corresponding devices, it is necessary for the computer system supported by the USB to additionally have installed a particular combined set of a special operating system (OS) and a dedicated driver for driving the USB corresponding peripheral or I/O devices (hereinafter referred to as USB devices). That is, even if the computer system supports a USB connector as hardware, it cannot actually drive the USB devices by only using a usual OS environment, such as a combination of DOS and UNIX, without also installing the particular set of the special OS and the dedicated driver.

Recently, to achieve a thinner body of a hand-held type computer system, it has meant supporting a USB connector in the computer body without installing a floppy disk drive (FDD) in the computer body. Instead of the installed FDD, a USB corresponding floppy disk drive (hereinafter referred to as a "USB FDD") is detachably coupled to the computer through a USB connector installed in the body.

However, as explained above, the computer system cannot actually drive the USB FDD by a conventional BIOS-ROM program without adding a special OS and a dedicated driver. That is, there is a problem in that the computer system having the USB connector must additionally have installed the combined set of the special OS and the dedicated driver for actual drive control of the USB FDD.

Further, there is another problem in increasing the peripheral devices coupled to the computer system. A conventional IBM PC/AT compatible type computer system has been restricted to an increase in the number of system interrupt requests (IRQs) to fifteen. Consequently, even if the USB is provided in the computer system, the flexibility of increasing the number of various peripheral devices for coupling to the USB connector is still restricted by the maximum number of IRQs.

There is still another problem in a working area in memory for executing a control program for the USB FDD. The control program for the USB FDD has conventionally been executed by using a lower access area of less than 1 mega (M) byte in a primary memory. The lower access area is also used as a user area for executing host programs, such as an OS and other application programs. To execute the control program for the USB FDD, a large portion of the lower access area becomes occupied. Consequently, the host programs cannot effectively use the lower access area.

SUMMARY OF THE INVENTION

Accordingly, an object of the present invention is to solve the aforementioned problems of a conventional computer system that supports a USB interface.

For achieving the above-noted objects and other objects, in accordance with the present invention, there is provided a computer system comprising:

a CPU supporting a plurality of operating modes including at least a real mode and a pseudo-real mode;

an interrupt control means for issuing an interrupt signal of highest priority instructing execution of an interrupt program in the pseudo-real mode;

a memory having an access area which becomes accessible when the interrupt signal of highest priority has been issued to the CPU;

an I/O controller for executing a communication process for driving an I/O device; and the memory for storing the interrupt program executed by using the access area.

Also, in accordance with the present invention there is provided a computer system, comprising:

a CPU supporting a plurality of operating modes including at least a real mode and system management mode (SMM);

an interrupt control means for issuing a system management interrupt (SMI) signal of highest priority instructing execution of an interrupt program in the SMM;

a memory having a higher access area higher than 1 MB which becomes accessible when the SMI signal has been issued to the CPU;

an I/O host controller (I/O HC) for executing a command communication process for driving an I/O device; and the memory for storing the interrupt program executed by the SMI signal generating process and the command communication process executed in the SMM.

Further in accordance with the present invention there is provided a computer system, comprising:

means for receiving a request for performing an I/O process from a host program;

means for generating a system management interrupt (SMI) signal after receiving the I/O process request;

means for executing the I/O process after generating the SMI signal; and means for outputting an executing status of the I/O process to a CPU.

Additionally in accordance with the present invention there is provided a method for controlling a drive of an I/O device comprising the steps of:

reading out an I/O drive process routine based on a request from a host program;

confirming whether or not the read out I/O drive process routine uses the I/O device;

judging whether or not data communication to the I/O device is necessary after the confirming step;

issuing an interrupt signal of highest priority to a CPU when the data communication is judged necessary by the judging step;

executing the data communication after issuing the interrupt signal of highest priority;

examining whether or not the data communication has completed; and generating a value for an output register when the examining step judges completion of the data communication.

Also in accordance with the present invention there is provided a method for controlling driving of an I/O device, comprising the steps of:

receiving a request for an I/O process from a host program;

generating a system management interrupt (SMI) after receiving the request;

executing the I/O process by a split process after generating the SMI; and outputting a status of the I/O process to the host program after completion of the split process.

BRIEF DESCRIPTION OF THE DRAWINGS

A more complete appreciation of the present invention and many of the attendant advantages thereof will be obtained as the same becomes better understood by reference to the following detailed description when considered in connection with the accompanying drawings, wherein.

DESCRIPTION OF THE PREFERRED EMBODIMENTS

Figure 1:
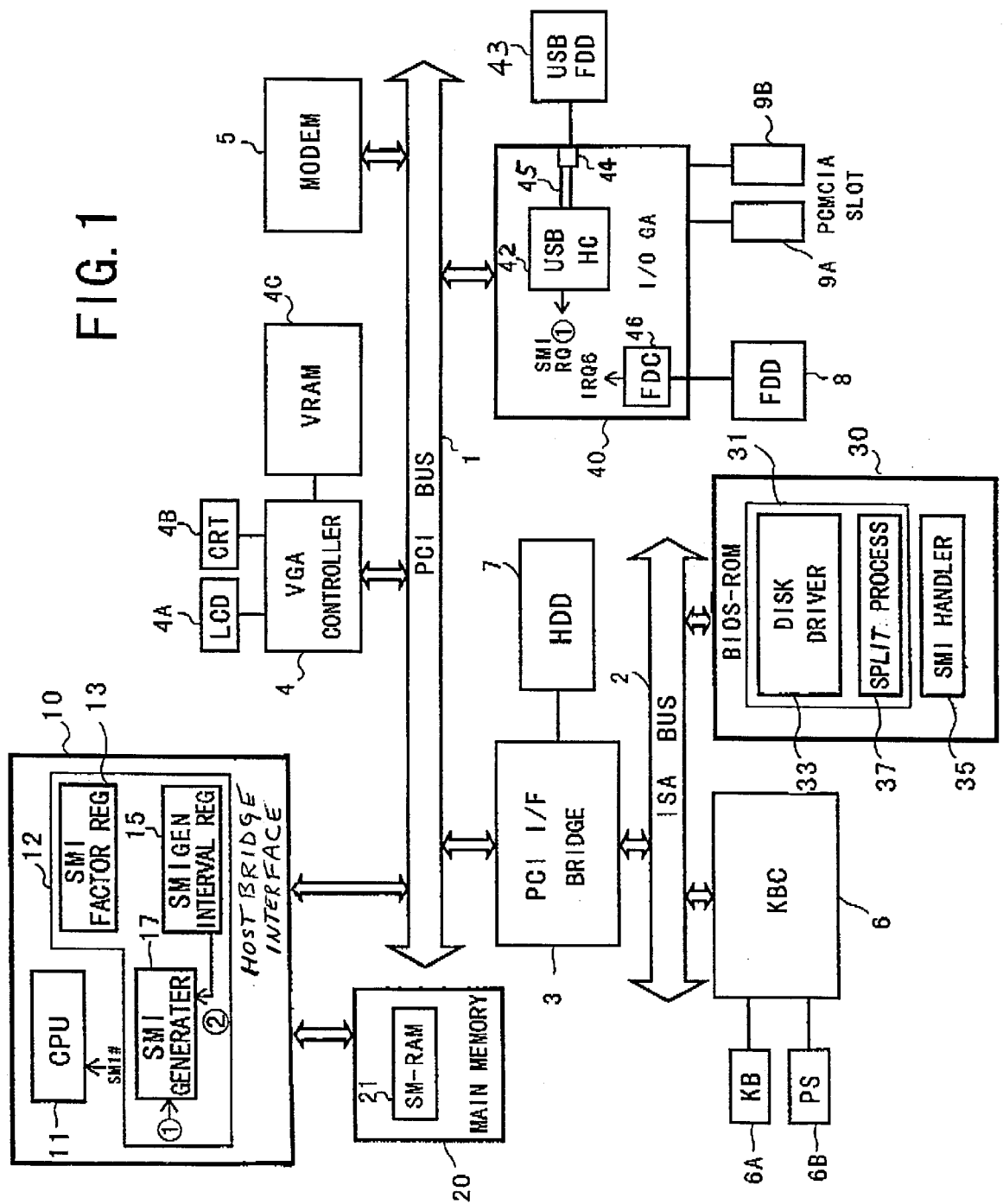
FIG. 1 is a block diagram illustrating an embodiment of a computer system of the present invention.

Referring now to the drawings, and more particularly, FIG. 1 thereof, there is illustrated an embodiment of the computer system according to the present invention.

Embodiments consistent with the present invention provide a novel computer system and a novel method for controlling driving of USB I/O devices without using a combined set of a special OS and dedicated driver for the USB devices.

Embodiments consistent with the present invention also provide a novel computer system and a novel method for increasing the flexibility of using various USB I/O devices by avoiding the restriction in the system IRQs available.

Also, embodiments consistent with the present invention provide a novel computer system and a novel method for improving the system efficiency of the computer system by shifting an execution area for the driver program of the USB device into a higher access area of more than 1 M byte in primary memory. Thus, for example, the system efficiency can be improved by increasing the lower access area in primary memory which can be used as a user area for the host programs.

Further, embodiments consistent with the present invention improve system efficiency of a computer system that supports the USB by applying split processing for executing a data communication process for a USB device driver. During the split time between the split processing of the data communication to a USB device, the BIOS can execute another process. That is, the system efficiency can thus be improved.

A computer system, e.g., a hand-held type computer, such as a notebook type or a sub-note type personal computer, according to the present invention, is shown in FIG. 1 and includes a CPU module 10 for controlling the entire operation of the system and executing data processing, a primary memory 20 for storing application programs governed by an OS and user data generated by the execution of the application programs, a BIOS-ROM 30 comprised of a reloadable flash memory, an I/O controller 40 comprised of a gate array (GA) for controlling various I/O devices, a peripheral component interconnect (PCI) bus 1 and an industry standard architecture (ISA) bus 2 for coupling such devices, and a PCI interface bridge (PCI I/F) 3 as an interface between the PCI bus 1 and the ISA bus 2. The BIOS-ROM 30 is coupled to the ISA bus 2, and the I/O GA controller 40 is coupled to the PCI bus 1.

The computer system further includes a VGA controller 4 for displaying image data in a video memory (VRAM) 4C on an LCD 4A or a CRT 4B; a modem 5 for controlling sound processing utilized by digital signal processing functions, such as a digital processor (DSP), MODEM (CODEC) or sound CODEC; a keyboard controller (KBC) 6 for controlling a keyboard (KB) 6A, pointing devices 6B, such as a pointing stick (PS) or a mouse; and a hard disk drive (HDD) 7 coupled to the PCI I/F 3.

The PCI I/F 3 is a gate array implemented by a one-chip LSI. The PCI I/F 3 stores a bi-directionally coupling bridge function between the PCI bus 1 and the ISA bus 2, and an integrated drive electronics (IDE) controller (not shown).

The I/O controller 40 is a gate array (GA) for controlling various I/O devices. To the I/O GA 40, various USB corresponding devices may be connected, including a USB FDD, a detachable external FDD, or PC cards 9A, 9B adhering to the personal computer memory card international association (PCMCIA)/CARD bus standard. Further, the I/O controller 40 includes a USB host controller (USB HC) 42 for controlling USB devices, such as a USB FDD 43 through a serial port, parallel port, infrared communication port, a USB terminal 44 and a USB coupling cable 45, and a FDD controller (FDC) 46 for controlling an external FDD 8.

The BIOS-ROM 30 stores a system basic I/O system (SM-BIOS) 31 which is an interrupt program executed during a system management mode (SMM) (described below). The SM-BIOS 31 includes an initial reliability test (IRT), various device drivers for I/O devices, a system management program executing an interrupt control in the SMM, and various setup user data provided during a setup routine. Thus, the SM-BIOS 31 includes various system management interrupt (SMI) service routines, such as a disk driver processing routine 33, and a split processing module 37 for executing an I/O trap SMI process and a checking software SMI setup process.

The CPU module 10 includes a CPU 11, such as a Mobile Pentium® by Intel or equivalent, a cache, a memory controller (not shown) for controlling the primary memory 20, and a host bridge interface coupled between the CPU 11 and the PCI bus 1.

The host bridge interface for the CPU 11 includes an interrupt control circuit 12 for generating an interrupt signal (SMI) to the CPU 10. The interrupt control circuit 12 includes an SMI factor register 13 for discriminating generating factors of the SMI by using an SMI handler 35, in BIOS-ROM 30, for processing an SMI having a highest priority for interruption, an SMI interval generating register 15 for determining an issuing an interval of the SMI signal and an SMI generating circuit 17.

The SMI generating circuit 17 issues an SMI# signal to an SMI# pin of the CPU 11 in response to an SMI generating request (SMI RQ) signal ① from the USB host controller (HC) 42 and an interval signal ② from the SMI interval generating register 15.

The CPU 10 supports a plurality of operating modes, such as a real mode for executing the OS program and application programs, a virtual 8086 mode, and the system management mode (SMM) for executing a system management program. The real mode can access up to a maximum memory space of 1 M byte in which a physical address is determined by an offset value from a base address shown in a segment register.

A protect mode can access up to a maximum memory space of 4 G bytes for each task in which a linear address is determined by using an address mapping table which is referred to as a descriptor table. The linear address is finally converted to a physical address by paging.

The virtual 8086 mode comprises operating a program under the protect mode. More particularly, the program is constructed to operate in the real mode, and the real mode program is treated as one task in the protect mode.

The system management mode (SMM) which is used in an embodiment according to the present invention is a pseudo real mode for prohibiting reference to the descriptor table in order to prevent paging.

The system management interrupt (SMI) is one kind of non-maskable interrupt (NMI) and an interrupt of the highest priority which has a higher priority than a normal NMI and an interrupt (INTR) from a mask.

According to the present embodiment, by issuing the system management interrupt (SMI), various SMI service routines prepared as system management programs can be executed without depending upon the executing application programs or OS environment. When an SMI is issued to the CPU 10, the operation mode of the CPU 10 is switched to the SMM from a current executing mode, such as the real mode, the protect mode, or the virtual 8086 mode, in order to execute various SMI service routines which are prepared as system management programs in the system management mode (SMM).

A system management RAM (SM-RAM) 21 is provided in the primary memory 20 for using during execution of the system management program in the SMM. That is, it becomes possible to access the SM-RAM 21 when an SMI signal is issued to the CPU 11.

According to this embodiment, generation of the SMI signal issued to the CPU 11 is executed by an I/O trap SMI instruction process which is one of the SMI service routines in the SM-BIOS 31 and a generating interval determined by the SMI interval register 15. That is, as described before, the SMI generator 17 issues an SMI# signal to the CPU 11 in response to the SMI RQ signal ① supplied from the USB host controller (HC) 42 passing through the PCI bus 1 and also to an interval signal ② from the SMI interval generating register 15.

In order to set up the USB FDD 43, the USB host controller (USB HC) 42 provided in the I/O GA 40 must execute extensive communication with the SM-ROM 31. According to the present invention, this extensive communication process is performed as a split process routine 37 provided in the SM-ROM 31 by accessing the SM-RAM 21 as a work area. The work area in the SM-RAM 21 further includes a process for checking completion of the communication process for setting up the USB corresponding device and a status read out process for the communication process.

That is, according to the present invention, the communication for setting up the USB FDD 43 through the USB HC 42 is executed by a split process which is comprised of a command process by the USB HC 42 and a checking software SMI process. These processes, i.e., the split process, the communication completion checking process, and the communication status readout process, are executed in the SMM of the CPU 11.

Figure 2:
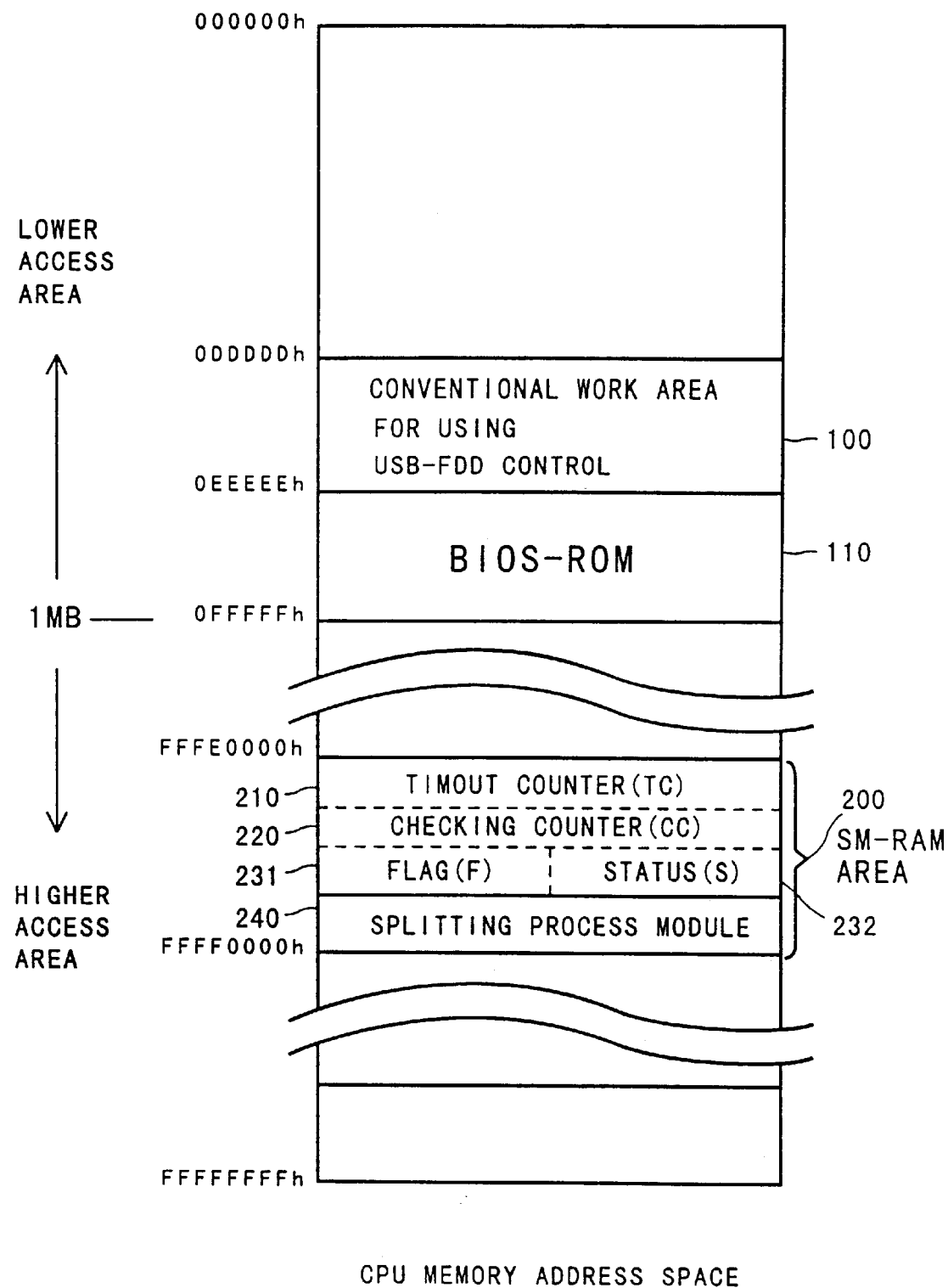
FIG. 2 illustrates a CPU memory map used in the embodiment of the computer system in FIG. 1.

FIG. 2 shows address spaces in the primary memory 20 including lower and higher access areas. The address 0FFFFFh corresponds to 1 MB. In a conventional USB system, it was necessary to map a work area for setting up the USB device in a lower access area of less than 1 MB, e.g., an address space 100 between 0DDDDDh and 0EEEEEh. Further, the work area for the BIOS-ROM 30 also needed a lower access area of less than 1 MB, such as an address space 110, i.e., between 0EEEEEh and 0FFFFFh. Consequently, these allocations of work areas adversely affected the execution of other application programs.

According to the present embodiment, the overlay of the SM-RAM 21 for setting up the USB device is mapped in a higher access area than 1 MB, e.g., a higher address area 200 between FFFE0000h and FFFF0000h. The address space for mapping the SM-RAM 21 is movable to a desired space up to 4 G byte as an SM-BASE register, in accordance with the memory allocation of the present embodiment. According to the present invention, by using the SMI signal, it becomes possible to access a higher address area than 1 MB.

Figure 3:
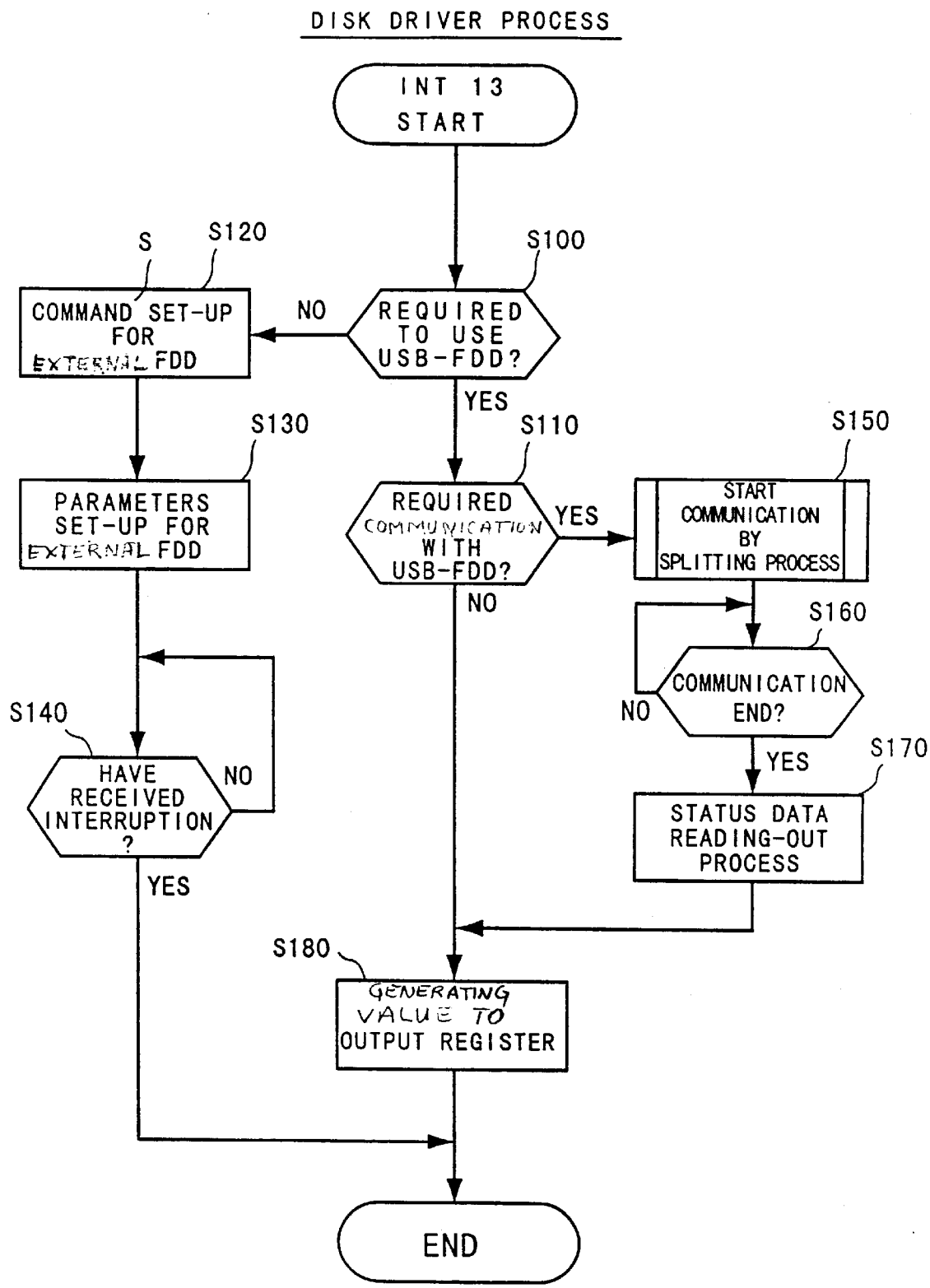
FIG. 3 is a flow chart explaining a disk driver processing routine in the embodiment of the computer system in FIG. 1.

Referring to FIGS. 1 to 3, the disk driver processing routine according to the embodiment will now be explained.

During the initialization of the computer system, the initial reliability test (IRT) program checks whether the USB FDD 43 is coupled to the I/O GA 40 by communicating with the USB HC 42. The IRT program further checks whether the detachable external FDD 8 is coupled to the I/O GA 40 from a predetermined register in I/O GA 40. The IRT program stores the coupling status of the USB FDD 43 in a status area (S) 232 in the CPU memory address space (FIG. 2).

A host program, such as an OS and an application program, calls a disk driver process routine 33 (INT 13) in the system BIOS (SM-BIOS) 31 for executing read/write operations for a FDD. The SM-BIOS includes the NT 13 for controlling the FDD through a FDD controller (FDC). The read-out disk driver process routine 33 (INT 13) confirms whether or not the USB FDD 43 is used by checking the status data (S) 232 in the SM-RAM area 200 which was stored during the execution of the IRT program (FIG. 3, Step S100).

If the process detects that the USB FDD 43 is not available to use, but the external FDD 8 is available to use (Step S100, No), the disk driver processing routine (INT 13) sets up the commands for the external FDD 8 in the FDC 46 (Step S120). After setting up the commands for the external FDD, the INT 33R further sets up parameters for the external FDD in the FDC 46 (Step S130).

After setting up the parameters for the external FDD, the disk driver processing routine judges whether or not a hardware interrupt (IRQ 6) has been received from the FDC 46 (Step S140). The IRQ 6 is one of the hardware interrupt signals from the FDC 46. As described above, the applicable interrupt signals are limited to up to fifteen signals in a conventional IBM-PC/AT compatible computer system.

After the interrupt controller detects the IRQ 6, an interrupt signal is supplied to an interrupt terminal of the CPU 11. If the process judges that the hardware interrupt IRQ 6 has been received (Step S140, Yes), the disk drive controlling process is finished (END in FIG. 3).

Returning to the confirming step of the USB FDD connecting status through the register in the I/O GA 40, when it is detected that the USB FDD 43 has been coupled to the USB bus 45 in the I/O GA 40 and that the USB FDD 43 is to be used (Step S100, Yes), the process discriminates whether or not it is required to communicate with the USB FDD 43 (Step S110).

If communication with the USB FDD is not required (Step S110, No), the disk driver process routine generates a fixed value for setting in an output register (Step S180). For example, in case of the functions from 12h to 14h of the INT 13, the disk driver process executes nothing to a floppy disk.

At Step S110, if the process judges that communication with the USB FDD 43 is required (Step 110, Yes), the disk driver process routine starts the communication with the USB FDD 43 through the USB HC 42 by the split process routine utilizing the I/O trap SMI (Step S150). The split process routine using the I/O trap SMI is explained below with reference to FIGS. 4 and 5.

After beginning communication with the USB FDD 43, the disk driver process routine issues the SMI # signal of the highest priority for the interrupt to the CPU 11 at a predetermined interval decided by the SMI interval register 15 in the CPU interrupt control circuit 12.

By referring to a predetermined flag (F) 231 stored in the SM-RAM work area 200, the disk driver process routine judges whether or not the communication by the split process routine of Step S150 has been completed (Step S160). When referring to the flag (F) 231 in the SM-RAM work area 200, if it is judged that the communication by the split process routine is not yet completed (Step S160, No), Step S160 is repeated until the communication has been completed.

When the communication is completed (Step S160, Yes), the disk driver process routine reads out the status data (S) 232 in the SM-RAM area 200 (Step S170).

Thus, in an embodiment consistent with the present invention, the communication process with the USB FDD 43 through the USB HC 42 is executed by the split process routine utilizing the I/O trap SMI. By utilizing the split process routine, it becomes possible to execute the USB FDD controlling program in a higher address area than 1 M, as shown in the SM-RAM area 200. Consequently, the host programs, such as OS or application programs can effectively use the lower access area of less than 1 M byte as the user memory area.

At Step S170 in FIG. 3, after the process reads out the status data (S) 232 from the SM-RAM area 200, the disk driver process routine generates a value for setting in an output register in accordance with the read out status data (S) 232 (Step S180). Then the disk driver process routine goes to completion.

In Step S180, the generation of a value for setting in an output register means, for example, setting a value "02h" in an AH register of the CPU 11. Further, after setting up a drive number at a bit 7 in a DL register, each of CF, AH and AL registers in the CPU 11 are respectively set up with the execution results of the BIOS. When the AH register has been set up with a value in the 80h, an error status for indicating a status that a diskette drive has not yet been prepared is set up.

Figure 4:
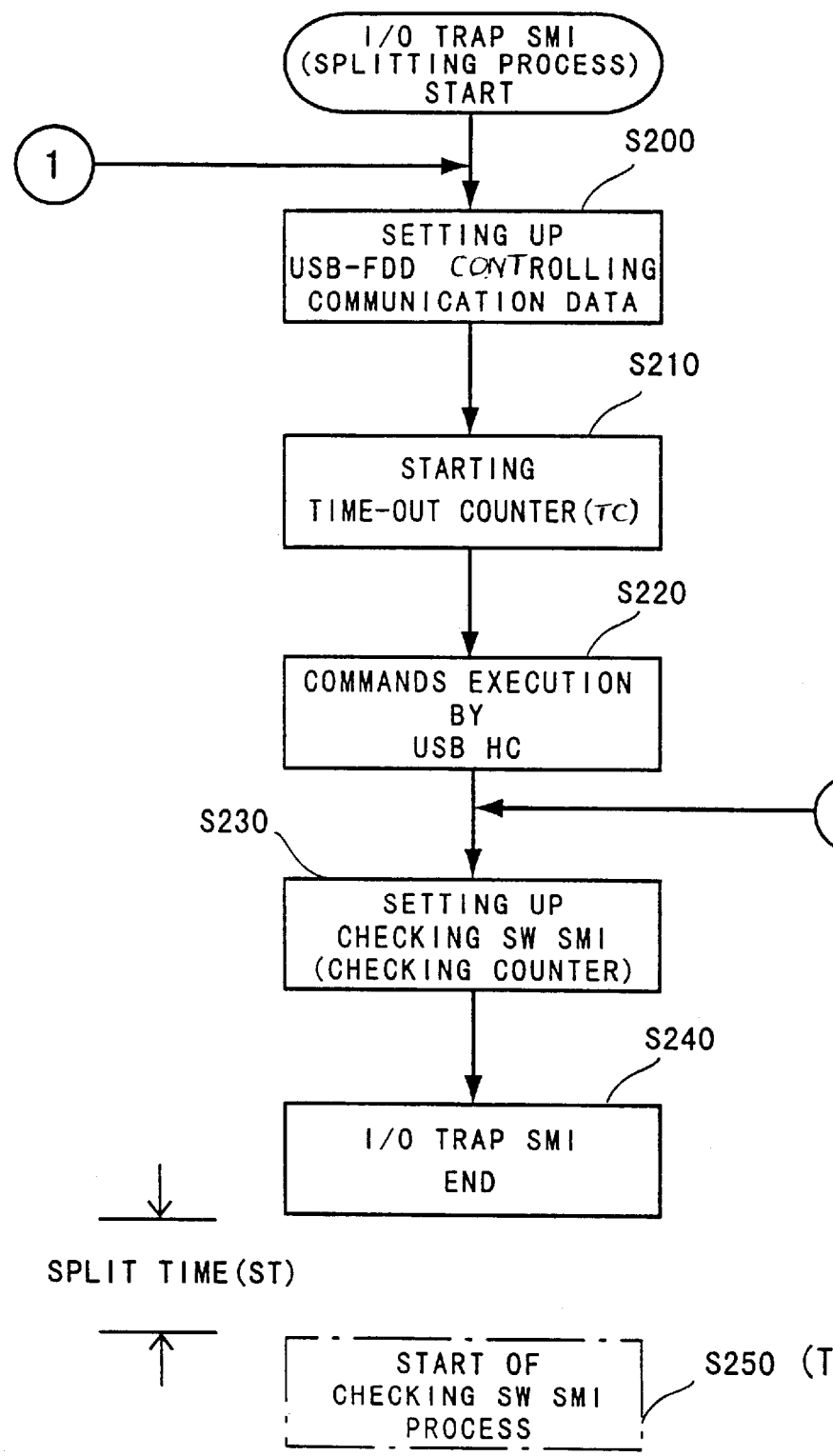
FIG. 4 is a flow chart explaining steps of a split processing routine for communicating to a USB FDD through a USB HC in the embodiment of the computer system in FIG. 1.
Figure 5:
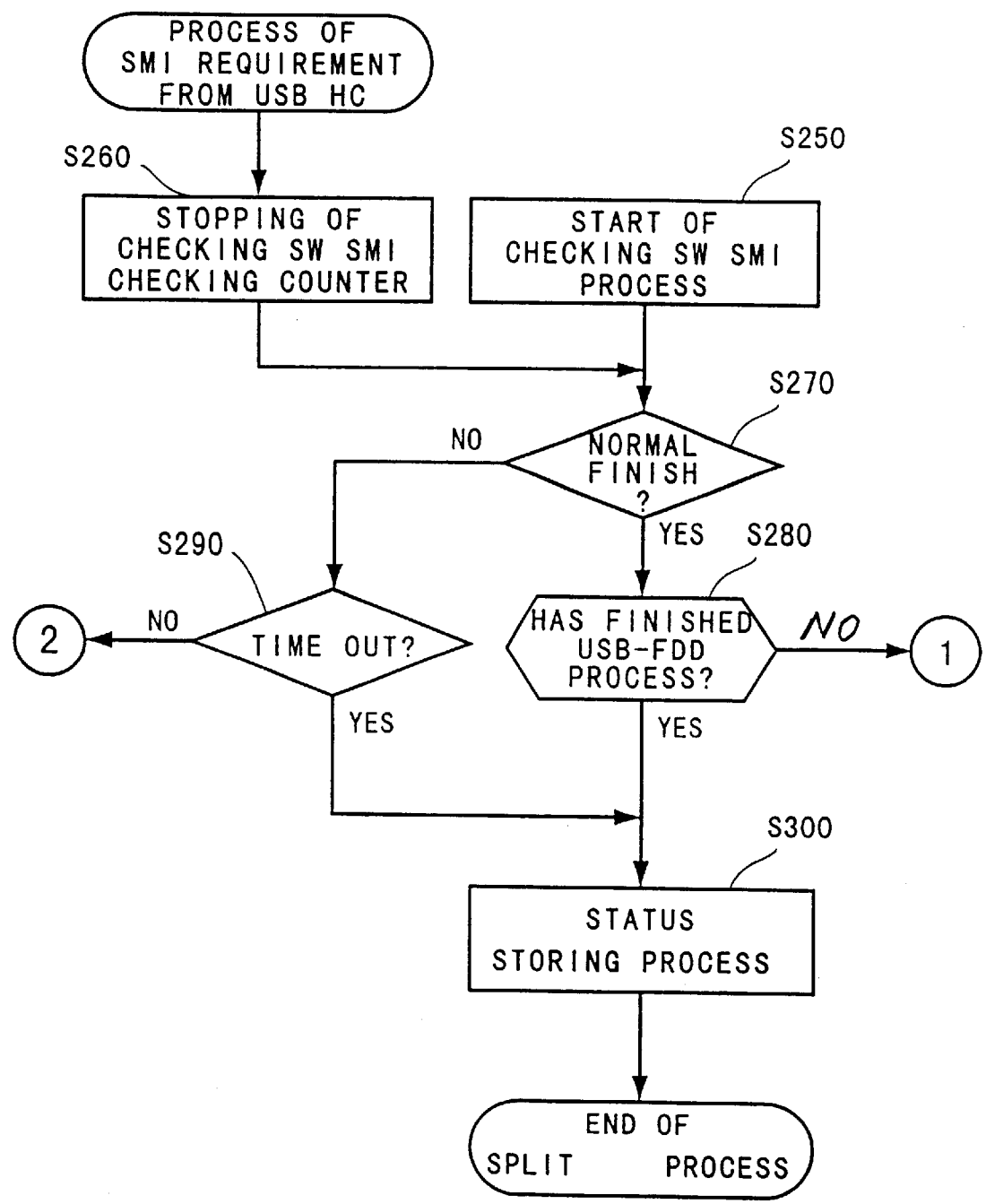
FIG. 5 is a flowchart explaining a SMI required processing routine in the embodiment of the computer system in FIG. 1.

Referring to FIGS. 4 and 5, the split process for setting up the communication process for the USB device passing through the USB HC 42, which is a feature consistent with the present invention, is described next.

To start the communication with the USB FDD 43 through the USB HC 42 at Step S150 in FIG. 3, an I/O trap SMI is issued at a particular I/O address by setting up a predetermined BIOS function processing number in the AH register of the CPU 11.

Accompanying the issuance of the SMI# signal, the CPU state is automatically stored in the SM-RAM 21, and the SMI handler 35 is read out in the SM-RAM area 200. The read out SMI handler 35 calls the split process routine 37 for setting up the communication data for controlling the USB FDD 43 with the USB HC 42 (FIG. 4, Step S200).

After setting up the USB FDD controlling communication data in the USB HC 42 at Step S200, a count value for using a time out process is set in a time out counter register (TC) 210 in the SM-RAM work area 200 (Step S210). The count value for the time out process is established based on a time stamp counter value in the CPU 11, for example, at a value of 5 seconds after the time stamp counter value in the CPU 11. After establishing the time out count value, the time out counter begins to count.

With the beginning of the count by the time out counter (TC) 210 in the SM-RAM area 200, the command process by the USB HC 42 is executed. That is, the communication data for controlling the USB FDD set up at Step S200 is executed (Step S220).

Since this I/O command process is time consuming in comparison to a normal BIOS processing time, when the command process by the USB HC 42 has begun at Step S220, the split process routine sets up a time for starting generation of the checking software SMI (SW SMI). That is, after setting a counter value in a checking counter (CC) 220 in the SM-RAM area 200 (Step S230), the I/O trap SMI is stopped (Step S240).

As the checking counter value, a value of 100 ms after beginning the count of the time stamp counter in the CPU 11 is set. The checking counter value is, as shown in FIG. 2, set up in the checking counter (CC) 220 in the SM-RAM area 200.

As described above, the command executing process by the USB HC 42 is much more time consuming than the BIOS processing time. However, according to this embodiment consistent with the present invention, the system BIOS executes another process, e.g., a system timer interrupt process, during a split time (ST) for execution of a next SMI process. Consequently, the computer system according to the present invention can improve the system efficiency by effectively executing other processes.

The SMI# signal is issued to the CPU 11 at a predetermined interval designated by the software SMI interval register provided in the CPU interrupt controlling circuit 12. For instance, a counter value of 15 ms is set up in the software SMI interval register 15. When the SMI# signal is issued to the CPU 11, the SMI handler 35 checks a generating factor of the SMI with reference to the SMI factor register 13 in the CPU interrupt controlling circuit 12.

When the set up checking counter (CC) 220 value set at Step S230 is counted to zero, it means a completion of the command execution by the USB HC 42, and the SMI handler reads out the split checking software SMI process routine shown in FIG. 5 (Step S250).

The read out split checking software SMI process routine discriminates whether or not the command execution by the USB HC 42 has normally finished (Step S270). Namely, by reading out the status register in the USB HC 42, the split process routine discriminates whether the command is still executing, has finished, or no error existed, and so on. If the routine judges that the command execution by the USB HC 42 has not normally finished (Step S270, No), or that the command operation is still executing, the process discriminates whether or not the command execution has already timed out based on the time out count value set at Step S210 (Step S290).

If the counted time set at Step S210 has already passed over the time count out value without any response from the USB HC 42, that is, the process judges that the command execution by the USB HC 42 has already timed out (S290, Yes), the command execution by the USB HC 42 is treated as an error and an error status indicating value is stored in the status area (S) 232 in the SM-RAM area 200 (Step S300), and the split process routine finishes.

At Step S290, if the routine judges that the command execution by the USB HC has not yet timed out (S290, No), the process goes back to Step S230 of the split process routine of FIG. 4. Again the checking counter (CC) 220 in the SM-RAM area 200 is set to count time for generating the software SMI.

This checking process is repeated until the judgment in Step S270 judges that the execution command has normally finished, that is, that the set up communication data for controlling the USB FDD 43 has been executed, or until the judgment in Step S290 judges that the command execution by the USB HC42 has timed out.

The system BIOS executes another process by utilizing the split time (ST) between the end of the I/O trap SMI process at Step S240 and the start of the checking software SMI at Step S250. During the execution of another process by the system BIOS, if the command execution by the USB HC 42 has finished, the process enters execution of the SMI request process from the USB HC 42.

Initially, the checking counter (CC) set up at Step S230 is stopped (Step S260). Then, it is judged whether or not the command execution by the USB HC 42 has normally finished (Step S250). If it has been judged that the command execution by USB HC 42 has normally finished (Step S270, Yes), it is judged whether or not the USB FDD process has completely finished by checking an execution status of another command set up in the USB HC 42 (Step S280). This is because the USB FDD 43 needs to execute a plurality of commands which have been set up in the USB HC 42 in order to execute a reading out process from a predetermined sector in the USB FDD 43.

If all USB FDD 43 processes have not yet finished (Step S280, No), the process goes back the step S200 for setting up the communication data for controlling the USB FDD 43. If all USB FDD 43 processes have already finished (Step S280,Yes), a predetermined value for indicating the completion of the communication process with the USB FDD 43 is established at the flag (F) area 231 in the SM-RAM area 200. Accompanying this, the communication result is stored in the status area (S) in the SM-RAM area 200 (Step S300). After storing the status (S) 232 showing the communication result, the split process of communication process finishes.

The disk driver process routine detects the completion of the communication process with the USB FDD 43 and also acquires the communication result of the command execution by the USB HC 42 from the flag (F) 231 or the status (S) 232 in the SM-RAM 200 by issuing the I/O trap SMI.

As described the above, according to the present embodiment consistent with the present invention, the drive control process for the USB corresponding device and the communication process to the USB HC 42 by the SM-BIOS are executed by the split process routine. Further, the split process routine is executed in the SM-RAM work area in a higher access area than 1 MB. Consequently, the SM-BIOS can efficiently execute a plurality of processes by utilizing the split time of the split process and, since the lower access area less than 1 MB can be efficiently used for execution of another application program, the system efficiency can be improved.

Further, according to the present invention, it becomes possible to execute the drive controlling process for the USB corresponding device without using one of the system IRQs which have been conventionally limited to up to fifteen.

Further, according to the present invention, it becomes possible to execute the controlling process of the USB corresponding devices without depending upon a special OS or a dedicated driver for the USB corresponding devices.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A computer system comprising:
    means for receiving a request for performing an I/O process from a host program, wherein said I/O process comprises a command process for communicating with a USB device through a USB host controller (HC);
    means for generating a system management interrupt (SMI) signal after receiving said I/O process request;
    means for executing said I/O process after generating said SMI signal by a split process, said executing means including:
        first means for counting a predetermined time for detecting a completion of said command process;
        means for judging whether a command execution by said USB HC has been normally completed after initiating counting by said counting means; and
        means for generating an I/O processing status when said judging means judges a completion of said command execution by said USB HC;
    means for outputting an executing status of said I/O process to a CPU;
    second means for counting a predetermined time for detecting an abnormal completion of said command process;
    means for judging whether said second counter means has counted beyond a time out value when said command process has abnormally completed; and means for resetting a count value in said second counter means.

2. The computer system according to claim 1, wherein said USB HC further includes means for issuing an SMI generating request;

wherein said judging means judges whether said command execution process by said USB HC has normally completed by stopping said first counting means when said SMI generating request has been received before said second counting means counts over the time out value.

3. The computer system according to claim 1, further including:

means for judging a necessity of communication with said USB device after receiving said I/O process request from said host program.

4. The computer system according to claim 1, further comprising:

means for receiving a disk drive processing request from a host program;

means for executing said split process of said I/O process after receiving said request; and means for outputting a status of said I/O process to said host program.

5. A method for controlling a drive of an I/O device comprising the steps of:

reading out an I/O drive process routine based on a request from a host program;

confirming whether or not the read out I/O drive process routine uses the I/O device;

judging whether or not data communication to the I/O device is necessary after the confirming step;

issuing an interrupt signal of highest priority to a CPU when the data communication is judged necessary by the judging step;

executing the data communication after issuing the interrupt signal of highest priority;

examining whether or not the data communication has completed; and generating a value for an output register when the examining step judges completion of the data communication.

6. The method of claim 5, wherein the I/O device is a USB I/O device;

said executing step including a step of executing the data communication by a split process.

7. The method according to claim 6, wherein said confirming step confirms whether or not said read out I/O drive process routine uses said USB I/O device by reading status data in a system management memory during an execution of an initial reliability test program.

8. The method according to claim 6, wherein said step of issuing an interrupt signal of highest priority is judged necessary when said USB I/O device issues said highest priority interrupt signal with a predetermined interval set up in a register in a CPU interrupt controller.

9. The method according to claim 6, wherein said examining step examines whether or not the split process has completed by referring to a flag in a system management memory.

10. The method according to claim 6, wherein:

said generating step generates said value for said output register by setting up a predetermined value in a predetermined register in said CPU.

11. The method according to claim 6, wherein:

said step of executing the data communication includes communicating with said USB I/O device by splitting an I/O trap system management interrupt (SMI) process and a checking software SMI process.

12. The method according to claim 11, said I/O trap SMI process comprising the steps of:

issuing said I/O trap SMI process at a particular I/O address by setting a predetermined number for a BIOS process in a predetermined register in said CPU;

setting up communication data for controlling the USB I/O device by a read out SMI handler in accordance with said issued I/O trap SMI process;

setting up a count value for detecting a time out of said communication process;

executing said data communication to said USB I/O device while starting said counting; and setting up a time for generating said checking software SMI process.

13. The controlling method according to claim 12, wherein said step of setting up said count value is based on a time stamp counter value in said CPU.

14. The controlling method according to claim 11, said checking software SMI process comprising the steps of:

judging whether or not said data communication process to said USB I/O device has normally completed;

detecting whether or not said data communication process has already timed out when said judging step judges an abnormal completion of said data communication process;

storing an error status of said data communication process if said detecting step detects a time out of said data communication process; and setting up a time for generating said checking software SMI process.

15. The controlling method according to claim 14, wherein said step for judging a normal finish of said data communication process to said USB I/O device is performed by reading out a status register in a USB host controller.

* * * * *